(12) United States Patent
Lee et al.

(10) Patent No.: US 7,746,034 B2
(45) Date of Patent: Jun. 29, 2010

(54) BATTERY MODULE

(75) Inventors: Gun-Goo Lee, Yongin-si (KR);
Tae-Yong Kim, Yongin-si (KR);
Yoon-Cheol Jeon, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 195 days.

(21) Appl. No.: 11/497,574

(22) Filed: Jul. 31, 2006

(65) Prior Publication Data
US 2007/0029966 A1 Feb. 8, 2007

(30) Foreign Application Priority Data
Jul. 29, 2005 (KR) .................. 10-2005-0069492

(51) Int. Cl.
*H02J 7/04* (2006.01)
*H01M 2/00* (2006.01)
*H01M 10/50* (2006.01)
*H01M 2/12* (2006.01)

(52) U.S. Cl. .............. 320/150; 429/120; 429/148; 429/83; 429/72

(58) Field of Classification Search ........... 320/150, 320/153; 429/98, 120, 82, 83, 93, 61, 62, 429/72
See application file for complete search history.

(56) References Cited

U.S. PATENT DOCUMENTS

2003/0027037 A1* 2/2003 Moores et al. ............... 429/82
2004/0207368 A1* 10/2004 Kimoto et al. ............. 320/150
2006/0028183 A1* 2/2006 Izawa et al. ............... 320/150

FOREIGN PATENT DOCUMENTS

| CN | 1319916 A | 10/2001 |
|---|---|---|
| DE | 195 03 085 A1 | 9/1996 |
| EP | 1 139 483 A1 | 10/2001 |
| EP | 1139483 A1 | 10/2001 |
| EP | 1 662 602 A1 | 5/2006 |
| JP | 11-178115 | 7/1999 |

(Continued)

OTHER PUBLICATIONS

Search Report for corresponding European patent application No. 06118121.0-2119 dated Sep. 25, 2006.

(Continued)

*Primary Examiner*—Edward Tso
*Assistant Examiner*—Alexis Boateng
(74) *Attorney, Agent, or Firm*—Christie, Parker & Hale, LLP (57) ABSTRACT

A battery module includes unit cells and a housing for accommodating the unit cells therein, the housing having paths for circulating a cooling medium. The housing includes: a unit cell receptor for receiving the unit cells, the unit cell receptor having an inner space with an inner spatial section area perpendicular to a longitudinal direction of the housing; and a cooling medium circulator having an inner space for circulating a cooling medium, the inner space being in communication with the inner space of the unit cell receptor and having an inner spatial section area perpendicular to the longitudinal direction of the housing. The inner spatial section area of the unit cell receptor is larger than the inner spatial section area of the circulator.

15 Claims, 7 Drawing Sheets

FOREIGN PATENT DOCUMENTS

| | | |
|---|---|---|
| JP | 2000-67934 | 3/2000 |
| JP | 2001-105894 | 4/2001 |
| JP | 2002-141113 | 5/2002 |
| JP | 2002-190288 | 7/2002 |
| JP | 2004-306726 | 11/2004 |
| JP | 2004-311139 | 11/2004 |
| JP | 2004-311157 | 11/2004 |

OTHER PUBLICATIONS

Patent Abstracts of Japan, Publication No. 2000-067934; Publication Date: Mar. 3, 2000; in the name of Kiba.

Japanese Office action dated Mar. 23, 2010 for corresponding Japanese application 2006-206381, noting listed references in this IDS.

\* cited by examiner

BATTERY MODULE

CROSS-REFERENCE TO RELATED APPLICATION

This application claims priority to and the benefit of Korean Patent Application No. 10-2005-0069492 filed in the Korean Intellectual Property Office on Jul. 29, 2005, the entire content of which is incorporated herein by reference.

BACKGROUND OF THE INVENTION

1. Field of the Invention

The present invention relates to a rechargeable battery, and in particular, to a battery module which is constructed by interconnecting a plurality of unit cells, and involves heightened cooling efficiency of the unit cells.

2. Description of Related Art

A conventional high-capacity rechargeable battery (referred to hereinafter as a "battery module") is constructed by serially interconnecting a plurality of rechargeable battery cells (referred to simply as the "unit cells"). The respective unit cells include an electrode assembly with positive and negative electrode plates while interposing a separator, and a case mounting the electrode assembly therein. A cap assembly is fitted to the case to seal it, and positive and negative electrode terminals are electrically connected to current collectors of the positive and the negative electrode plates of the electrode assembly.

In typical prismatic batteries, the respective unit cells are arranged such that the positive and the negative electrode terminals thereof protrude out of the top of the cap assembly and alternate with the positive and negative electrode terminals of the neighboring unit cell. A conductor interconnects the screwed negative and positive electrode terminals via a nut.

If the temperature difference between the locations of the respective unit cells within the battery module is large, the battery capacity deteriorates, so heat dissipation is advantageous. If the heat is not dissipated properly, the temperature deviation between the respective unit cells deteriorates the charge/discharge efficiency. The internal temperature of the battery is elevated due to the heat generated from the unit cells to deteriorate the battery capacity, and, in a serious case, the battery may explode.

Particularly when the battery module is used to drive a motor for an electronic washer, an electric scooter or a vehicle (such as an electric vehicle or a hybrid electric vehicle), the module is charged and discharged by a high electric current so that the heat generated due to the internal reaction of the unit cells during the usage thereof is liable to be elevated to a considerable degree. This badly affects the battery characteristic, and deteriorates the inherent battery capacity. Accordingly, proper heat dissipation is advantageous.

SUMMARY OF THE INVENTION

A battery module includes unit cells and a housing for accommodating the unit cells therein, the housing having paths for circulating a cooling medium. The housing includes: a unit cell receptor for receiving the unit cells, the unit cell receptor having an inner space with an inner spatial section area perpendicular to a longitudinal direction of the housing; and a cooling medium circulator having an inner space for circulating a cooling medium, the inner space being in communication with the inner space of the unit cell receptor and having an inner spatial section area perpendicular to the longitudinal direction of the housing. The inner spatial section area of the unit cell receptor is larger than the inner spatial section area of the circulator. In one embodiment, the circulator includes an inlet for accepting the cooling medium into the inner space of the circulator and for allowing a flow of the cooling medium to the unit cells.

An interface between the inner space of the cell receptor and the inner space of the circulator may have a stepped structure, which may be angled, such as a right-angled structure. A step-height of the interface may be 13%-23% of the inner spatial section area of the unit cell receptor.

The inner spatial section area of the cell receptor and the inner spatial section area of the circulator may have a substantially rectangular cross section.

The unit cells may be mounted as a cell assembly within the unit cell receptor and spaced from one another along the longitudinal direction of the housing. Further, the circulator may be connected to the cell receptor along the longitudinal direction of the housing.

A second cell assembly may also be included, and the cell assemblies may be arranged within the housing to face each other with a distance therebetween. The cell assemblies may be positioned on a same plane within the housing. In one embodiment, the circulator includes an inlet for allowing a flow of the cooling medium to the cell assembly, and an outlet for exhausting the cooling medium after it has passed through the cell assembly.

The cell assembly may include barriers disposed between the unit cells.

One embodiment also includes a second cell receptor and the inlet is disposed between the cell receptors.

The unit cells may be arranged within a plurality of cell assemblies, and the plurality of cell assemblies may be mounted within the cell receptor.

In one embodiment, the number of the unit cells is 20-80. In another embodiment, the unit cells are arranged within at least one cell assembly in groups of 20.

In another embodiment, a battery module includes unit cells aligned in a first direction; and a housing for accommodating the unit cells therein. The housing includes a unit cell receptor for receiving the unit cells, the unit cell receptor having an inner space; and a cooling medium circulator having an inner space for circulating the cooling medium, the inner space being in communication with the inner space of the unit cell receptor. A height of the inner space of the unit cell receptor in a second direction is greater than a height of the inner space of the circulator in the second direction. The second direction is perpendicular to the first direction and to a longitudinal direction of the housing.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

The present invention will be described more fully hereinafter with reference to the accompanying drawings, in which examples of embodiments of the invention are shown.

In the following description, air is described as the cooling medium for unit cells of a battery module. However, the present invention is not limited to such a case, and cooling water or other fluids may also be used as the cooling medium.

Figure 1:
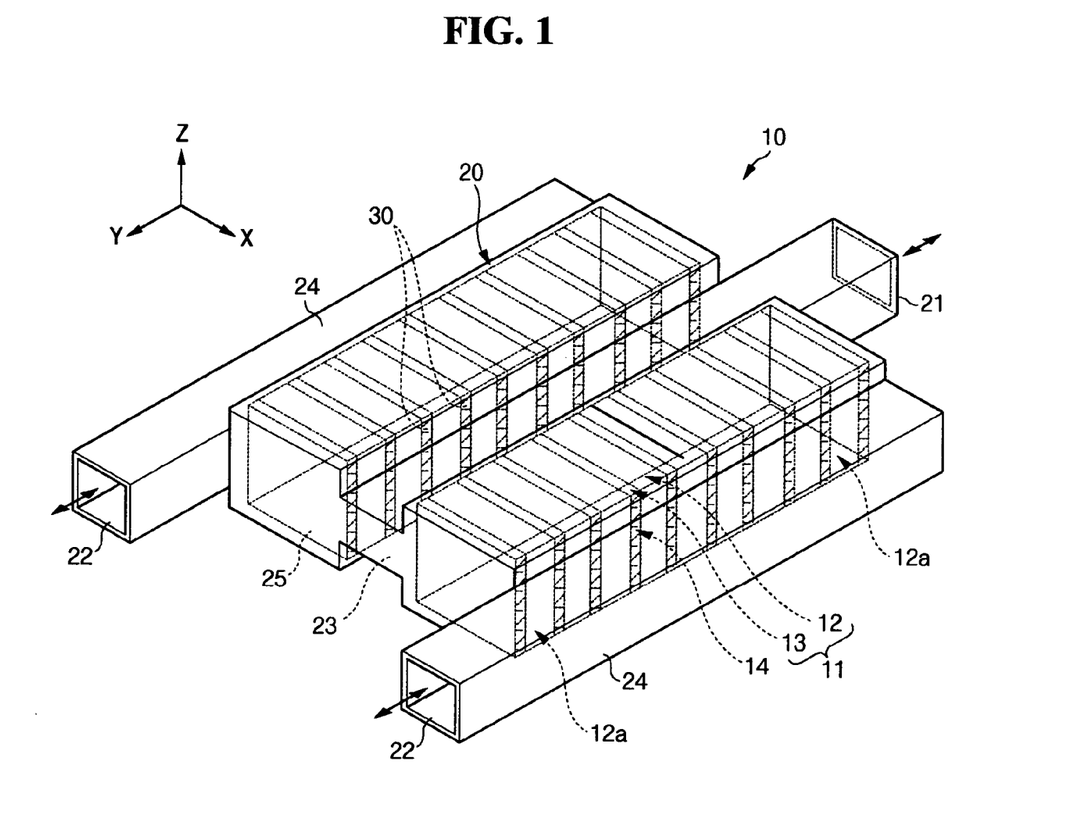
FIG. 1 is a schematic perspective view of a battery module according to an embodiment of the present invention.
Figure 2:
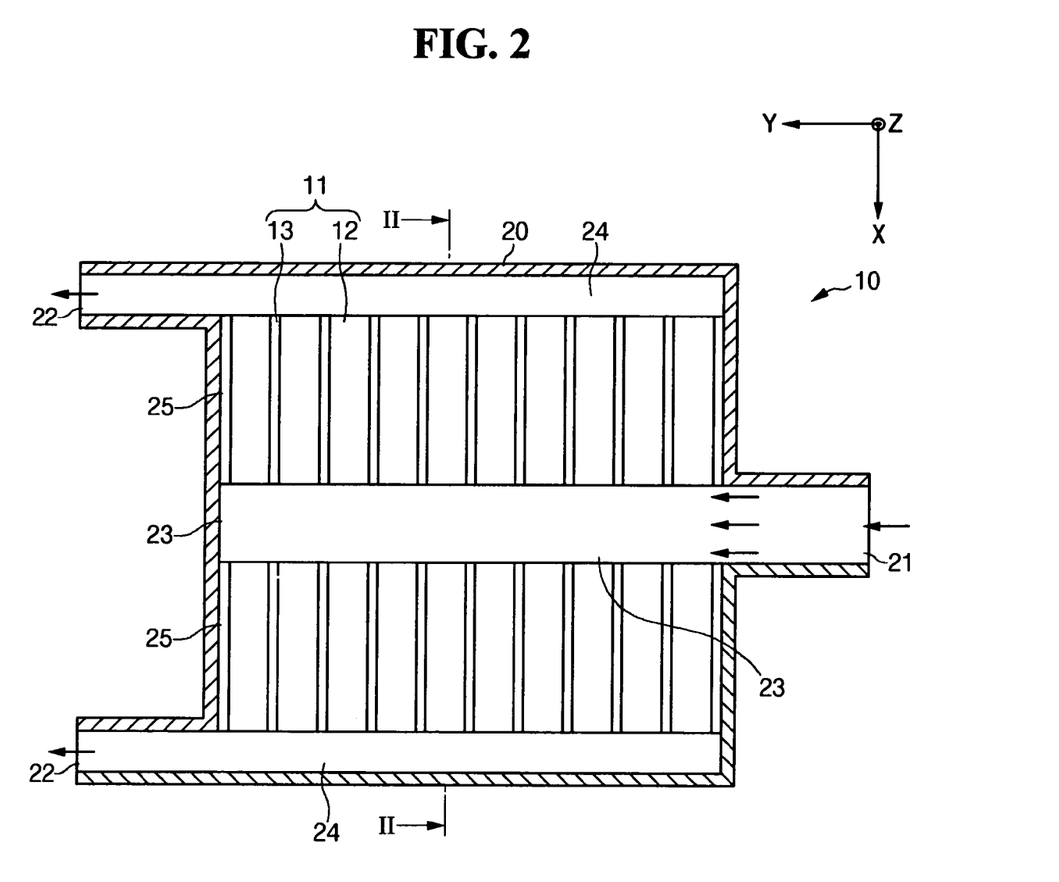
FIG. 2 is a schematic plan elevation view of the battery module shown in FIG. 1.

As shown in FIGS. 1 and 2, a battery module 10 includes cell assemblies 11, each with a plurality of unit cells 12 sequentially arranged and spaced from each other to form a row of cells. In one embodiment, the spacing between each of the unit cells is predetermined. The battery module also includes a housing 20 mounting the cell assemblies 11 therein and having paths for circulating the temperature control air around the respective unit cells.

The respective unit cells 12 have a common rechargeable cell structure for charging and discharging by an amount of electric power, which may be predetermined. The cell structure has an electrode group with positive and negative electrode plates with a separator interposed therebetween.

In this embodiment, the cell assembly 11 is formed by laminating the unit cells 12, which are roughly rectangular-shaped with a pair of long sides and a pair of short sides with an extended horizontal width.

Specifically, one or more cell assemblies 11 are mounted within the housing 20. In this embodiment, two cell assemblies are placed on the same plane while facing each other with a distance therebetween in order to minimize the total height of the battery module 10.

In one embodiment, each of the two cell assemblies 11 is formed with twenty (20) unit cells 12, and accordingly, a total of forty (40) unit cells are mounted within the housing 20. In the present invention, however, the total number of unit cells is not limited thereto, and a different number of unit cells or cell assemblies may be included in the housing.

A cell barrier 13 is provided between the neighboring unit cells 12 as well as external to the outermost unit cell 12a to space the respective unit cells 12 from each other while circulating the temperature control air, and to support the lateral sides of the respective unit cells 12. The spacing between the respective unit cells 12 may be predetermined.

For this purpose, channels 14 are formed at the respective barriers 13 to circulate a cooling air with a relatively low temperature around the unit cells 12 and to control the temperature thereof. In this embodiment, the channels 14 are formed by a plurality of protrusions formed at the barrier 13. The present invention is not limited to this structure, however, and the channels may have any structure capable of circulating the temperature control air.

The housing 20 mounts the cell assemblies 11 therein, and circulates the temperature control air through the channels 14 of the barriers 13 arranged between the respective unit cells 12, thereby dissipating the heat generated from the respective unit cells.

In this embodiment, the housing 20 includes unit cell receptors 25 for receiving the cell assemblies 11, an air inlet 23 formed at the center thereof between the cell assemblies 11 facing each other, and air outlets 24 formed at both sides thereof external to the respective cell assemblies 11. The air inlet 23 and the air outlet 24 are to circulate the temperature control air.

The air inlet 23 is connected to an inlet hole 21 to introduce air into the housing 20, and the air outlet 22 is connected to an outlet hole 22 to discharge the air to the outside of the housing 20.

Depending upon the cooling medium flow type (a blower type or a suction type) of the battery module 10, the air inlet 23 and the air outlet 24 may take the inflow or outflow of the cooling medium.

In the case of a blower type flow, the air inlet 23 for taking in the temperature control air is placed at the center of the housing 20, and the air outlets 24 for exhausting the temperature control air are placed at both sides of the housing 20, and the air is blown through the inlet hole 21 of the air inlet 23.

Each of the unit cell receptors 25 has an internal space for fixedly accommodating the cell assembly 11. In this embodiment, the receptors 25 are placed at opposite sides of the air inlet 23, and the two cell assemblies 11 are mounted at the relevant unit cell receptors 25 in the longitudinal direction of the housing 20 (in the Y direction of FIGS. 1 and 2).

The air inlet 23 is placed at the center of the housing 20 such that it communicates with the inlet hole 21 positioned at the center of the housing 20.

The air outlets 24 are placed external to the respective cell assemblies 11 at opposite inner sides of the housing 20 such that they communicate with the outlet holes 22 that are aligned with the flow of the temperature control air. The air inlet 23 and the air outlet 24 communicate with the unit cell receptors 25.

Accordingly, the temperature control air enters the air inlet 23 formed at the center of the housing 20 via the inlet hole 21, and passes through the barriers 13 between the unit cells 12 of the respective cell assemblies 11 arranged along the air inlet 23 toward the air outlet 24, followed by being discharged to the outside of the housing 20 via the outlet hole 22.

With the above-structured battery module 10, the inner spatial section area of the unit cell receptor 25 is established to be larger than the inner spatial section area of the air inlet 23. The sectional area of the unit cell receptor 25 and the air inlet 23 refers to the sectional area thereof perpendicular to the longitudinal direction Y of the housing 20 (in the X direction of FIGS. 1 and 2).

Figure 3:
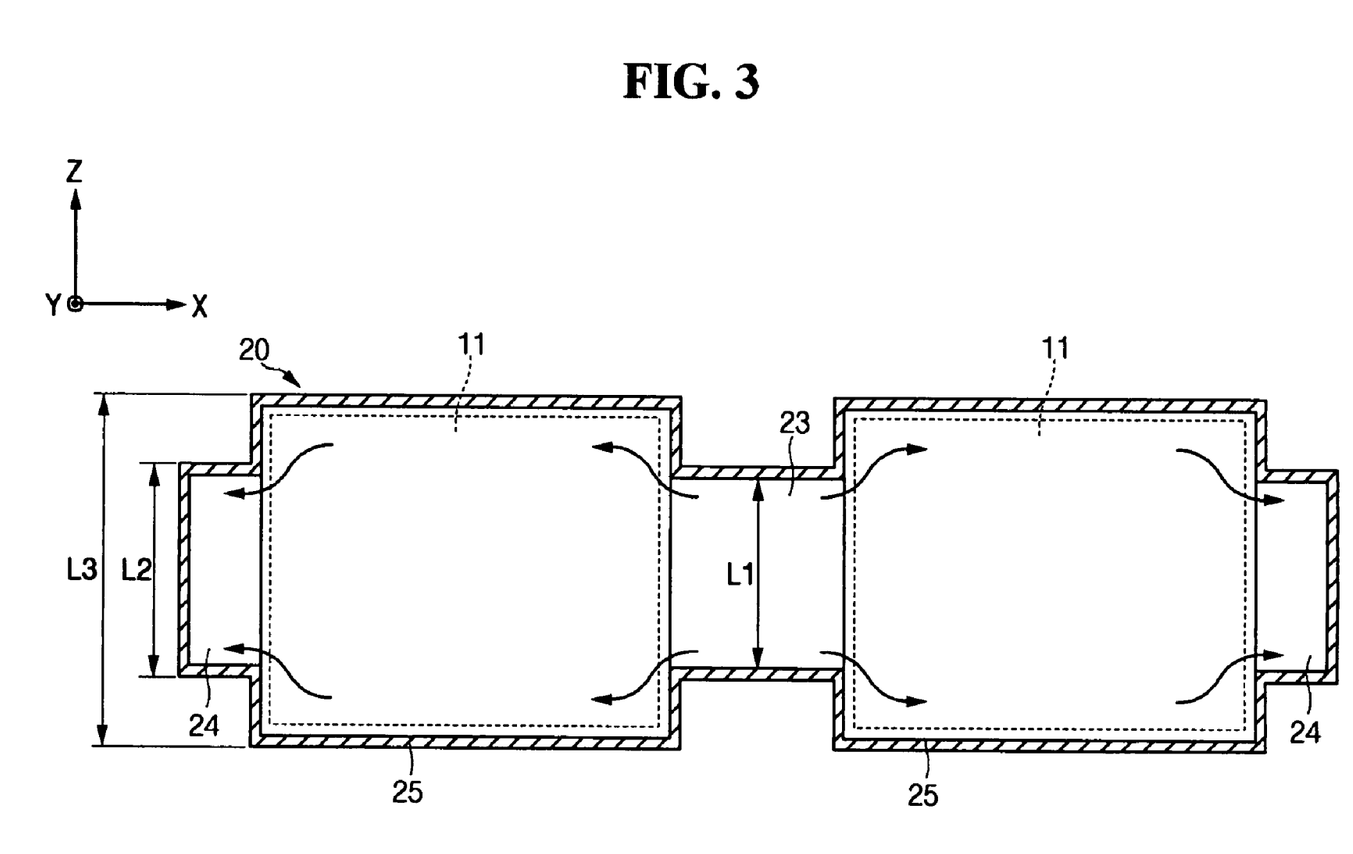
FIG. 3 is a cross sectional view of the battery module taken along the II-II line of FIG. 2.

In order that the unit cell receptor 25 and the air inlet 23 substantially have the above relation, in this embodiment, the interface between the unit cell receptor 25 and the air inlet 23 has a stepped structure, as shown in FIG. 3.

The internal corners of the unit cell receptor 25 may have an angled structure, such as a right-angled structure. Referring to FIGS. 1-3, the unit cell receptors 25 and the air inlet 23 each have a substantially rectangular cross-section. The air outlet 24 may also have a substantially rectangular cross-section.

On the basis of the drawings, the top and the bottom of the unit cell receptor 25 and the air inlet 23 are all stepped, but the invention is not limited thereto. In one embodiment, for example, the stepped structure is formed on only one side of the unit cell receptor 25 and the air inlet 23.

In the embodiment shown in FIGS. 1-3, the unit cell receptor 25 also has a larger sectional area than the air outlet 24.

With this structure of the housing 20, when the cooling air flows in to the cell assemblies 11 mounted within the unit cell receptors 25 through the air inlet 23, the cooling air is diffused from the air inlet 23 with a relatively small sectional area to the unit cell receptors 25 with a relatively large sectional area, and hence, the flow speed thereof is increased, thereby heightening the cooling efficiency with respect to the unit cells 12 of the cell assemblies 11.

As shown in FIG. 3, as the air inlet 23 is stepped only with respect to the cell receptors 25 along the Z axis direction, the sectional height L3 of the unit cell receptor 25 is greater than the sectional height L1 of the air inlet 23.

The step-height of the air inlet 23 with respect to the unit cell receptor 25 is defined by the difference between the sectional height L1 of the air inlet 23 and the sectional height L3 of the unit cell receptor 25. The sectional height L1 of the air inlet 23 is established to be 54~74% of the sectional height L3 of the unit cell receptor 25.

The top or bottom step-height of the air inlet 23 is established to be 13~23% of the sectional height L3 of the unit cell receptor 25.

When the step-height is less than 13%, the diffusion of the cooling air is not properly made so that it becomes difficult to increase the flow speed of the cooling air. By contrast, if the step-height exceeds 23%, the amount of inflow of the cooling air to the unit cell receptors is too small to exert the desired cooling efficiency.

The above structure may be equally applied to the air outlet 24. That is, the sectional height L2 of the air outlet 24 is established to be 54~74% of the sectional height L3 of the unit cell receptor 25, and the top or bottom step-height of the air outlet 24 to be 13~23% of the sectional height of the unit cell receptor 25.

The operation of the above-structured battery module will be now explained in detail.

Referring again to FIGS. 1-3, when a temperature control air supply (not shown) connected to the inlet hole 21 is driven, the temperature control air is introduced into the housing 20 via the inlet hole 21. The temperature control air flows in along the air inlet 23, and passes through the respective unit cell assemblies 11, and flows out along the air outlet 24 to be discharged to the outside via the outlet hole 22.

When the cooling air flowing in along the air inlet passes through the unit cell receptors 25 in which the cell assemblies 11 are mounted, the flow speed thereof is increased by way of diffusion so that the circulated air flows out from the unit cell receptors 25 at a faster speed.

The sectional height of the air inlet 23 is smaller than the sectional height of the unit cell receptor 25, and the cooling air proceeds abruptly from the location with a small area to the location with a large area so that it is diffused within the unit cell receptors 25. With this arrangement, the cooling air passes around the respective unit cells 12 of the cell assemblies 11 within the unit cell receptors 25 in a speedy manner.

As the cooling air speedily enters the cell assemblies 11, the temperature difference between the front and the rear unit cells 12 of the cell assemblies 11 along the flow of the cooling air is reduced so that the temperature distribution within the cell assemblies is substantially uniform.

Figure 4A:
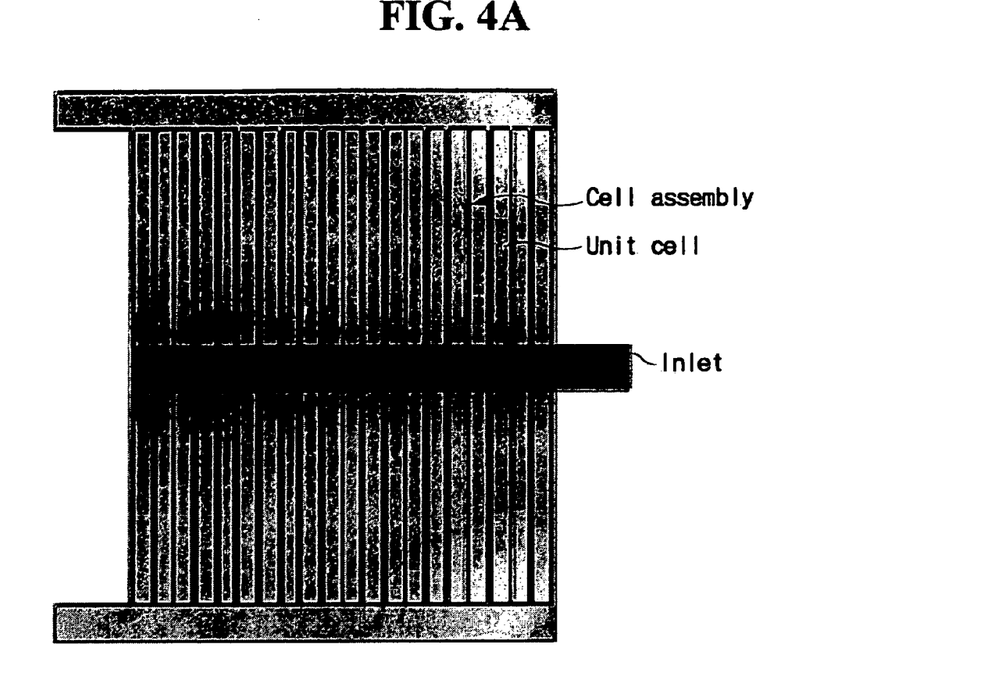
FIG. 4A shows a simulation result illustrating the temperature distribution of unit cells of a battery module according to an Example.
Figure 4B:
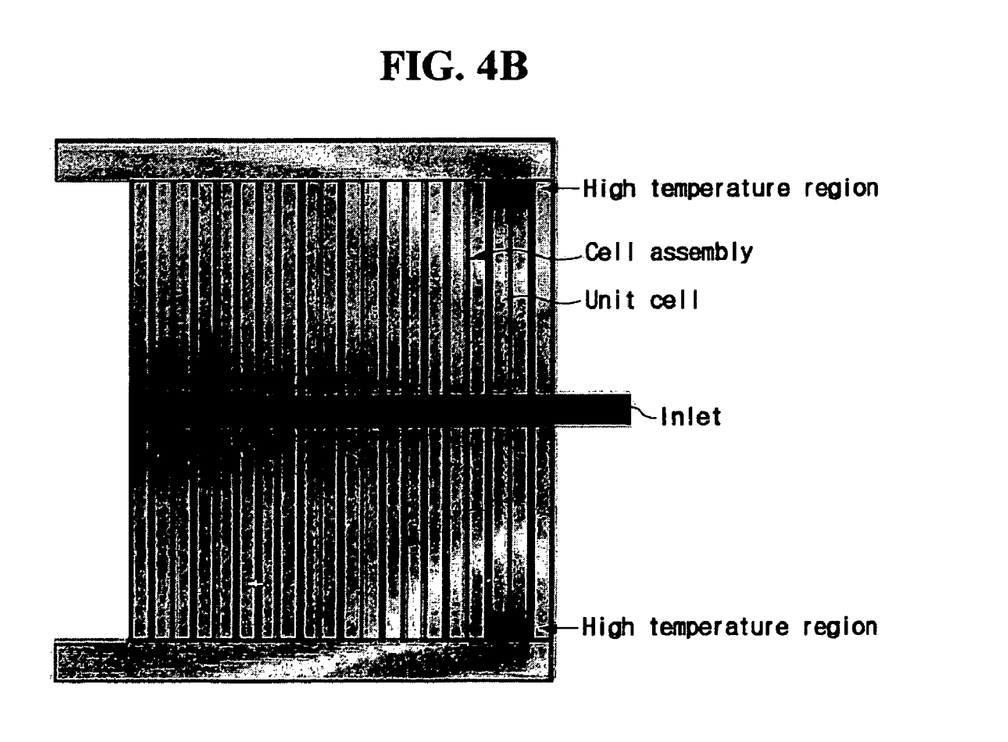
FIG. 4B shows a simulation result illustrating the temperature distribution of unit cells of a battery module according to a Comparative Example.
Figure 4C:
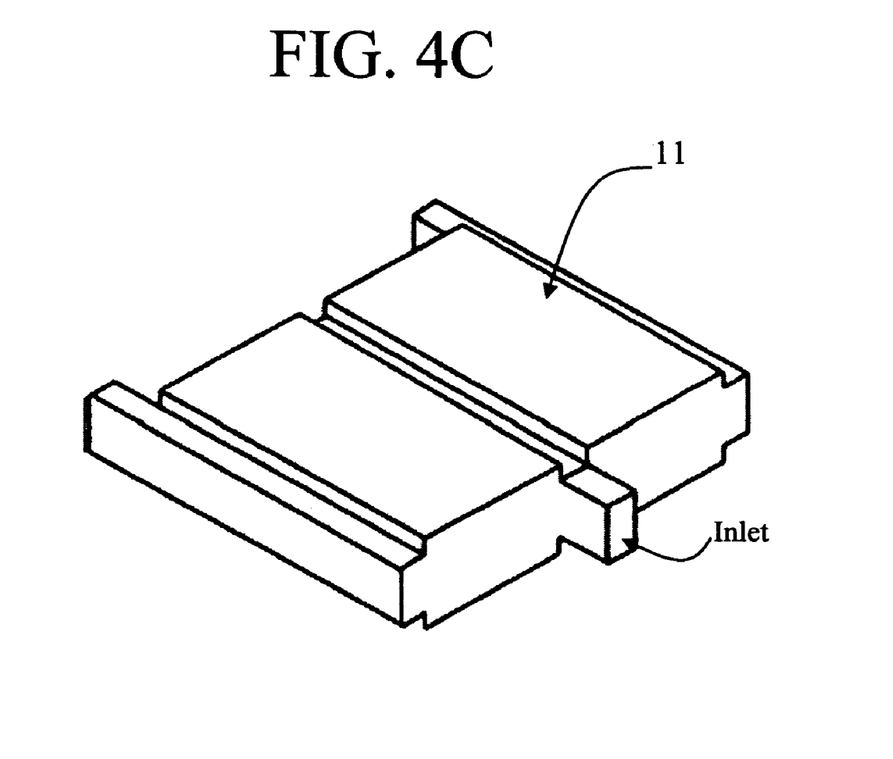
FIG. 4C is a schematic perspective view of a battery module according to the Example.

FIG. 4A shows a simulation result illustrating the temperature distribution of unit cells of cell assemblies with a battery module according to an Example of one embodiment of the invention. A schematic perspective view of the battery module according to the Example is shown in FIG. 4C. FIG. 4B shows a simulation result illustrating the temperature distribution of unit cells of cell assemblies with a battery module according to a Comparative Example. A schematic perspective view of the battery module according to the Comparative Example is shown in FIG. 4D.

With the battery module shown in FIGS. 4A and 4C, the air inlet has a height in a direction perpendicular to the longitudinal direction of the module that is the smaller than a height of the unit cell receptors. The high temperature region near the inlet hole shown in FIG. 4B was also removed so that the temperature of the unit cells placed at the side of the inlet hole was reduced significantly. Consequently, the uniformity of temperature distribution with respect to all of the unit cells of the cell assemblies 11 was enhanced.

Figure 4D:
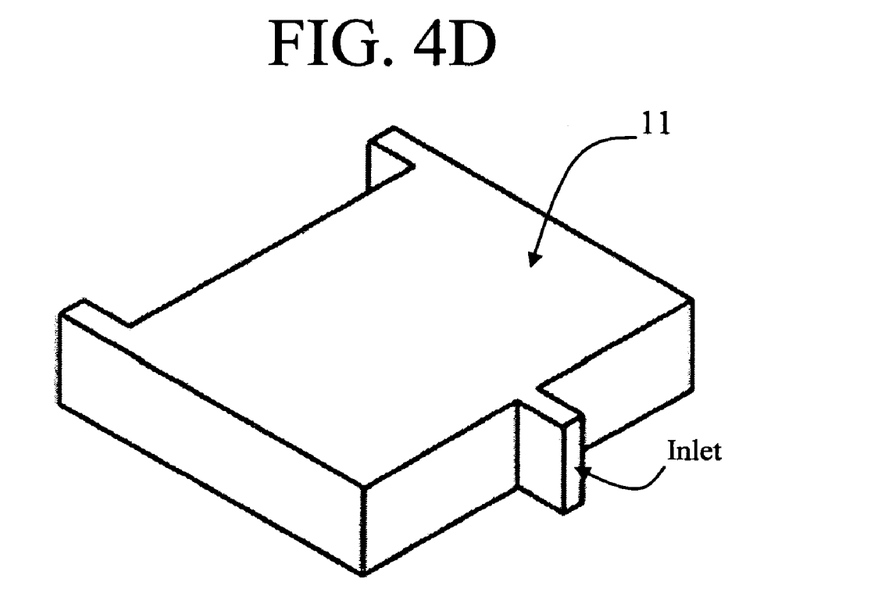
FIG. 4D is a schematic perspective view of a battery module according to the Comparative Example.

With the battery module according to the Comparative Example shown in FIGS. 4B and 4D, the sectional area of the unit cell receptor and the air inlet was established to be the same as that with the battery module according to the Example. However, the air inlet has a height in a direction perpendicular to the longitudinal direction of the module that is the same as a height of the unit cell receptors.

Figure 5A:
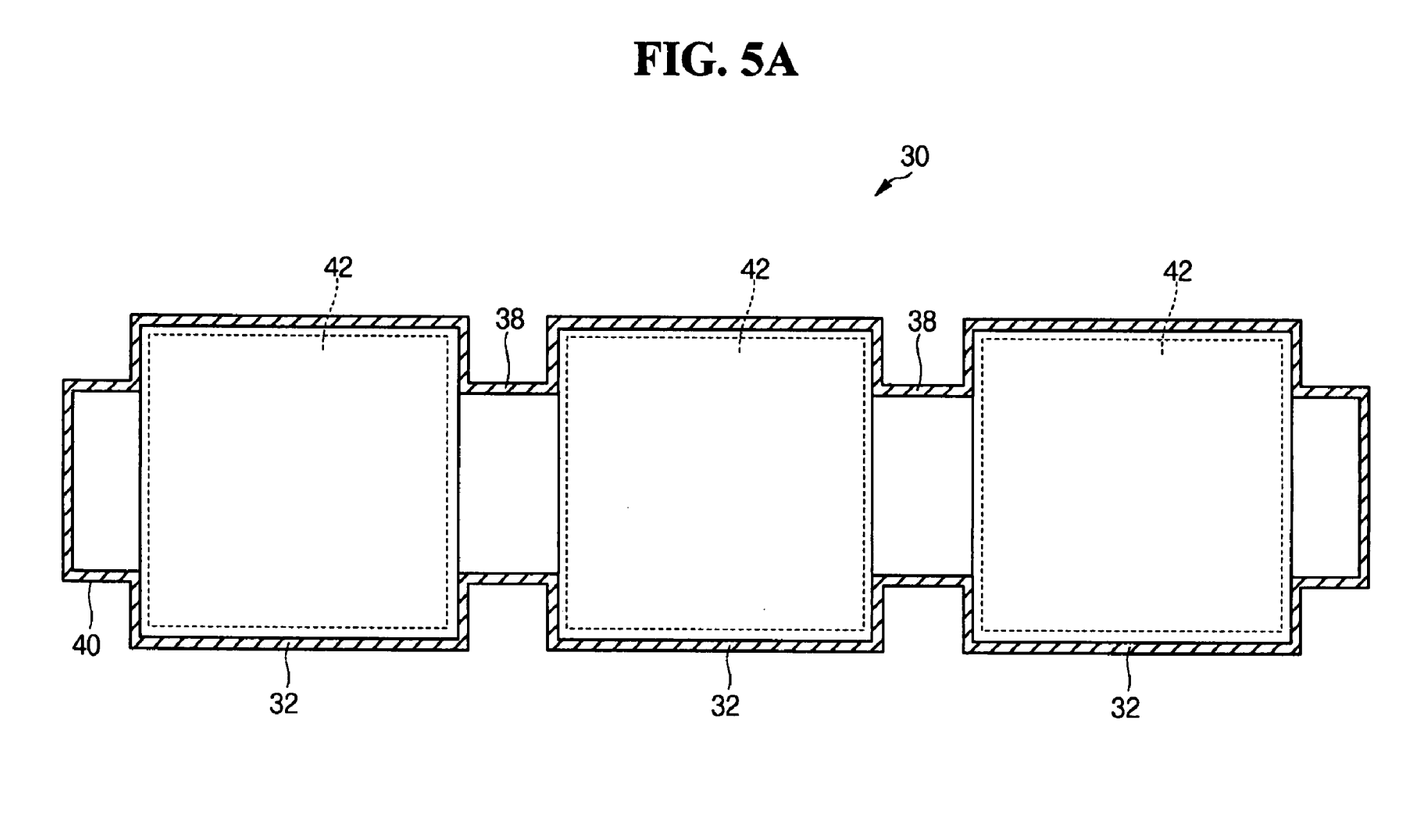
FIGS. 5A and 5B are schematic sectional views of battery modules according to other embodiments of the present invention.
Figure 5B:
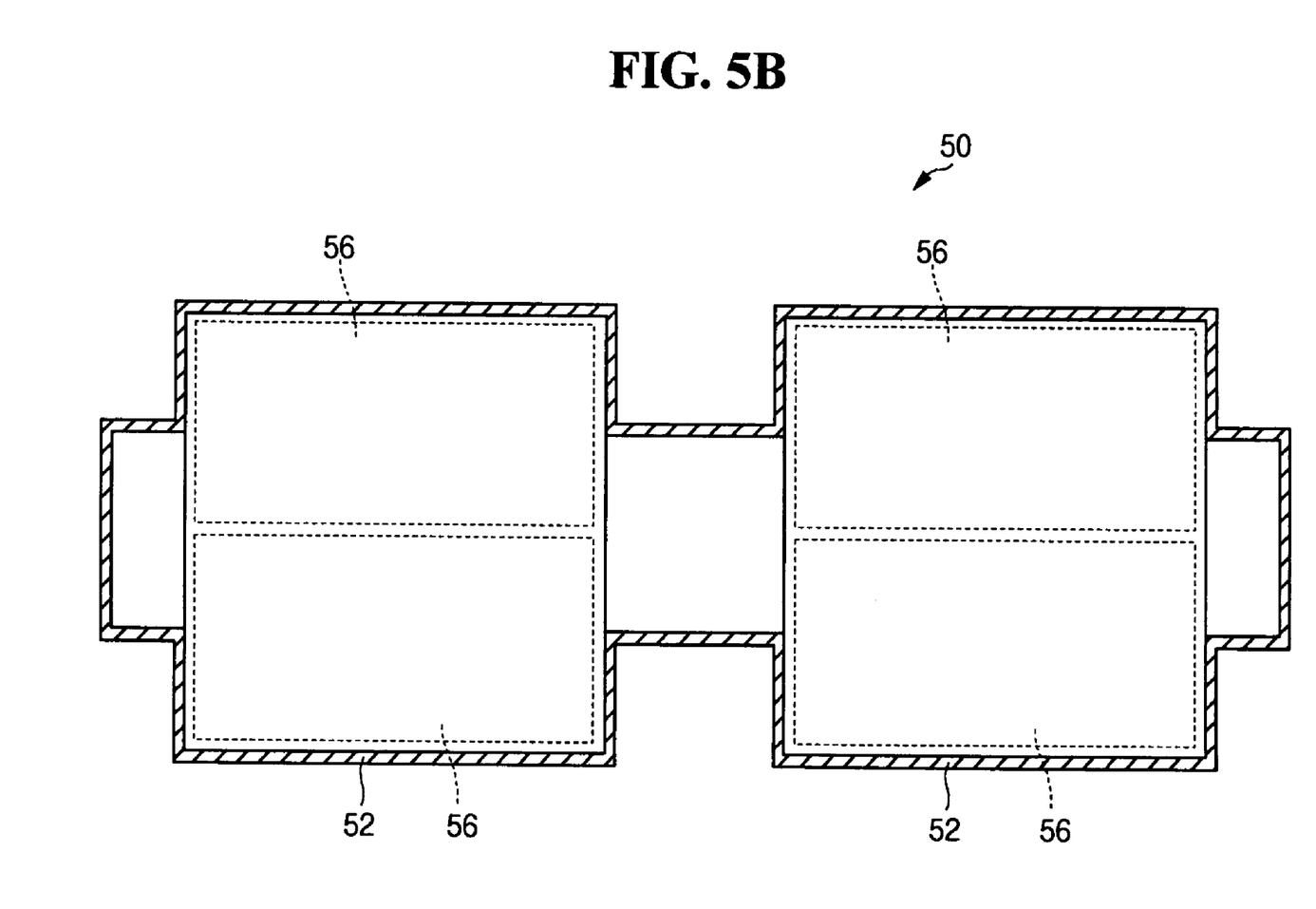

FIGS. 5A and 5B are cross sectional views of battery modules according to other embodiments of the present invention.

The battery module shown in FIG. 5A is constructed by sequentially arranging three unit cell receptors 32, 34, and 36 while interposing air inlets 38, and connecting air outlets 40 to the two outermost unit cell receptors 32 and 36.

The interrelation of the unit cell receptors 32, 34 and 36, the air inlets 38, and the air outlets 40 is substantially the same as described above. In this embodiment, the cell assemblies 42 mounted within the respective unit cell receptors 32, 34, and 36 are each formed with twenty (20) unit cells (not shown). That is, a total of sixty (60) unit cells are mounted within the battery module 30.

The battery module 50 shown in FIG. 5B has the same basic structure as that of the battery module shown in FIGS. 1, 2 and 3, but a plurality of cell assemblies 56 are mounted within the respective unit cell receptors 52 and 54.

Accordingly, in this embodiment, forty (40) unit cells are mounted within each of the respective unit cells 52 and 54. That is, a total of eighty (80) unit cells are mounted within the battery module 50.

In the above described embodiments, the structure for circulating the temperature control air is improved to thereby heighten the cooling efficiency of the battery module. As the temperature control air uniformly circulates through the unit cells, the problem of local thermal imbalance is lessened or eliminated over the entire area of the battery module.

Although exemplary embodiments of the present invention have been described, the present invention is not limited to these embodiments and examples, but may be modified in various forms without departing from the scope of the appended claims, the detailed description, and the accompanying drawings of the present invention. Therefore, such modifications belong to the scope of the present invention as defined by the appended claims and their equivalents.

What is claimed is:

1. A battery module comprising:

unit cells; and a housing accommodating the unit cells therein, the housing having paths for circulating a cooling medium, wherein the housing comprises:

a unit cell receptor for receiving the unit cells, the unit cell receptor having side walls defining an inner space with an inner spatial section area perpendicular to a longitudinal direction of the housing; and a cooling medium circulator having a channel extending in the longitudinal direction of the housing for circulating a cooling medium, the channel being in direct communication with the unit cell receptor at an interface, wherein the unit cell receptor is configured to receive the cooling medium from the channel at the interface;

wherein the side walls of the unit cell receptor extend from the channel at an angle in at least two directions at the interface to provide a stepped structure.

2. The battery module of claim 1, wherein the cooling medium circulator comprises an inlet for accepting the cooling medium into the channel of the cooling medium circulator and for allowing a flow of the cooling medium to the unit cells.

3. The battery module of claim 1, wherein internal corners of the interface have an angled structure.

4. The battery module of claim 3, wherein the internal corners of the interface have a right-angled structure.

5. The battery module of claim 1, wherein the inner spatial section area of the unit cell receptor and the channel of the cooling medium circulator have a rectangular cross section.

6. The battery module of claim 1, wherein a step-height of the interface is from about 13%-23% of the inner spatial section area of the unit cell receptor.

7. The battery module of claim 1, wherein the unit cells are mounted as a first cell assembly within the unit cell receptor and spaced from one another along the longitudinal direction of the housing, and the cooling medium circulator is connected to the unit cell receptor along the longitudinal direction of the housing.

8. The battery module of claim 7, further comprising a second cell assembly, the first cell assembly and the second cell assembly arranged within the housing to face each other with a distance therebetween.

9. The battery module of claim 8, wherein the first cell assembly and the second cell assembly are positioned on a same plane within the housing.

10. The battery module of claim 7, wherein the first cell assembly comprises barriers between the unit cells.

11. The battery module of claim 7, wherein the cooling medium circulator comprises an inlet for allowing a flow of the cooling medium to the cell assembly, and an outlet for exhausting the cooling medium after the cooling medium has passed through the cell assembly.

12. The battery module of claim 2, further comprising a second cell receptor, wherein the inlet is disposed between the unit cell receptor and the second cell receptor.

13. The battery module of claim 1, wherein the unit cells are within a plurality of cell assemblies, and the plurality of cell assemblies are mounted within the unit cell receptor.

14. The battery module of claim 1, wherein a number of the unit cells is between 20-80.

15. The battery module of claim 14, wherein the unit cells are arranged within at least one cell assembly in groups of 20.

* * * * *